US010885432B1

(12) United States Patent
Dulac-Arnold et al.

(10) Patent No.: US 10,885,432 B1
(45) Date of Patent: Jan. 5, 2021

(54) SELECTING ACTIONS FROM LARGE DISCRETE ACTION SETS USING REINFORCEMENT LEARNING

(71) Applicant: DeepMind Technologies Limited, London (GB)

(72) Inventors: Gabriel Dulac-Arnold, London (GB); Richard Andrew Evans, London (GB); Benjamin Kenneth Coppin, Cottenham (GB)

(73) Assignee: DeepMind Technologies Limited, London (GB)

( * ) Notice: Subject to any disclaimer, the term of this patent is extended or adjusted under 35 U.S.C. 154(b) by 1055 days.

(21) Appl. No.: 15/382,383

(22) Filed: Dec. 16, 2016

Related U.S. Application Data

(60) Provisional application No. 62/268,406, filed on Dec. 16, 2015.

(51) Int. Cl.
   *G06N 3/08* (2006.01)

(52) U.S. Cl.
   CPC .................................... *G06N 3/08* (2013.01)

(58) Field of Classification Search
   None
   See application file for complete search history.

(56) References Cited

U.S. PATENT DOCUMENTS

| 2007/0203871 A1* | 8/2007 | Tesauro | G06Q 10/06 706/53 |
| 2009/0098515 A1* | 4/2009 | Das | G09B 19/18 434/107 |
| 2009/0099985 A1* | 4/2009 | Tesauro | G05B 13/0265 706/12 |
| 2010/0241243 A1* | 9/2010 | Hans | G06N 20/00 700/12 |
| 2017/0024643 A1* | 1/2017 | Lillicrap | G06N 3/0454 |
| 2017/0076201 A1* | 3/2017 | van Hasselt | G06N 3/08 |

(Continued)

OTHER PUBLICATIONS

Santamaria et al. (Experiments with Reinforcement Learning in Problems with Continuous State and Action Spaces, Sep. 1997, pp. 163-217) (Year: 1997).*
Gaskett (Q-Learning for Robot Control, 2002, pp. i-203) (Year: 2002).*

(Continued)

*Primary Examiner* — George Giroux
(74) *Attorney, Agent, or Firm* — Fish & Richardson P.C.

(57) ABSTRACT

Methods, systems, and apparatus, including computer programs encoded on computer storage media, for selecting actions from large discrete action sets. One of the methods includes receiving a particular observation representing a particular state of an environment; and selecting an action from a discrete set of actions to be performed by an agent interacting with the environment, comprising: processing the particular observation using an actor policy network to generate an ideal point; determining, from the points that represent actions in the set, the k nearest points to the ideal point; for each nearest point of the k nearest points: processing the nearest point and the particular observation using a Q network to generate a respective Q value for the action represented by the nearest point; and selecting the action to be performed by the agent from the k actions represented by the k nearest points based on the Q values.

18 Claims, 5 Drawing Sheets

(56) References Cited

U.S. PATENT DOCUMENTS

2017/0228662 A1* 8/2017 Gu ..................... G06N 3/0427

OTHER PUBLICATIONS

Dulac-Arnold et al. "Reinforcement Learning in Large Discrete Action Spaces," arXiv preprint arXiv, Dec. 2015, 1512.07679.

Dulac-Arnold et al. "Fast reinforcement learning with large action sets using error-correcting output codes for MDP factorization," Joint European Conference on Machine Learning and Knowledge Discover in Databases, Sep. 2012, 10 pages.

Lagoudakis et al. "Reinforcement Learning as classification: Leveraging modern classifiers," ICML, Aug. 2003, vol. 3: pp. 424-431.

Mnih et al. "Human-level control through deep reinforcement learning," Nature, 2015, 518(7540) pp. 529-533.

Pazis et al. "Generalized value functions for large action sets," In Proceedings of the 28th International Conference on Machine Learning, ICML, 2011, 8 pages.

Todorov et al. "Mujoco: A physics engine for model-based control," Intelligent Robots and Systems (IROS), 2012, 8 pages.

Dietterich et al. "Solving multiclass learning problems via error-correcting output codes," Journal of artificial intelligence research, 1995, pp. 263-286.

Van Hassell et al. "Using Continuous action spaces to solve discrete problems," Neural Networks, 2009, pp. 1149-1156.

Hafner et al. "Reinforcement learning in feedback control," Machine learning, 2011, 84(1-2): pp. 137-169.

He et al. "Deep reinforcement learning with an unbounded actions space," arXiv preprint arXIV, 2015, 1511.04636.

Lillicrap et al. "Continuous control with deep reinforcement learning," arXiv preprint arXiv, 2015, 1509.02971.

Muja et al. "Scalable nearest neighbor algorithms for high dimensional data," Pattern Analysis and Machine Intelligence, 2014, pp. 2227-2240.

Silver et al. "Deterministic policy gradient algorithms," Proceedings of the 31st International Conference on Machine Learning, 2014, pp. 387-395.

* cited by examiner

SELECTING ACTIONS FROM LARGE DISCRETE ACTION SETS USING REINFORCEMENT LEARNING

CROSS REFERENCE TO RELATED APPLICATIONS

This application is a non-provisional of and claims priority to U.S. Provisional Patent Application No. 62/268,406, filed on Dec. 16, 2015, the entire contents of which are hereby incorporated by reference.

BACKGROUND

This specification relates to selecting actions to be performed by a reinforcement learning agent.

Reinforcement learning agents interact with an environment by receiving an observation that characterizes the current state of the environment, and in response, performing an action. Some reinforcement learning agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning. The subject matter described in this specification can be implemented in particular embodiments so as to realize one or more of the following advantages. Many reinforcement learning tasks involve selecting an action to be performed by an agent from a very large set of actions, i.e., an action set that includes a very large number of actions. The techniques described in this specification allow a reinforcement learning system to effectively select actions with sub-linear complexity relative to the size of the action set. Additionally, a reinforcement learning system can select actions in a manner that generalizes over the set of actions. Accordingly, reinforcement learning methods can effectively be applied to large-scale tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order for the agent to interact with the environment, the system receives data characterizing the current state of the environment and selects an action from a large, discrete action set in response to the received data. Data characterizing a state of the environment will be referred to in this specification as an observation.

The agent then performs the selected action and, as a result, the environment changes states and the system receives another observation characterizing the next state of the environment and a reward. The reward is a numeric value that is received by the system from the environment as a result of the agent performing the selected action.

In some implementations, the environment is a content item presentation setting provided by a content item recommendation system and the actor is one or more software programs that provides recommended content items to users. In these implementations, each action in the action set is a recommendation of a distinct content item to the user of the content item recommendation system.

In some implementations, the environment is an industrial process, e.g., a warehouse, a datacenter, an industrial plant, and so on, and the actor is a control system that manages the operation of the industrial process. In these implementations, the actions in the set of actions are each a slate of settings that define the operating characteristics of the industrial process.

In some implementations, the environment is a simulated environment and the agent is implemented as one or more computer programs interacting with the simulated environment. For example, the simulated environment may be a video game and the agent may be a simulated user playing the video game. As another example, the simulated environment may be a robotics simulation, where the agent is a simulated robot that models the interaction of a real-world robot with a real-world environment. As another example, the simulated environment may be a motion simulation environment, e.g., a driving simulation or a flight simulation, and the agent is a simulated vehicle navigating through the motion simulation. In these implementations, the actions may be points in a space of possible control inputs to control the simulated user, simulated robot or simulated vehicle.

In some implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be possible control inputs to control the robot or the autonomous vehicle.

In some cases, the observations characterize states of the environment using low-dimensional feature vectors that characterize the state of the environment. In some other cases, the observations characterize states of the environment using high-dimensional pixel inputs from one or more images that characterize the state of the environment, e.g., images of the simulated environment or images captured by sensors of the mechanical agent as it interacts with the real-world environment.

Figure 1:
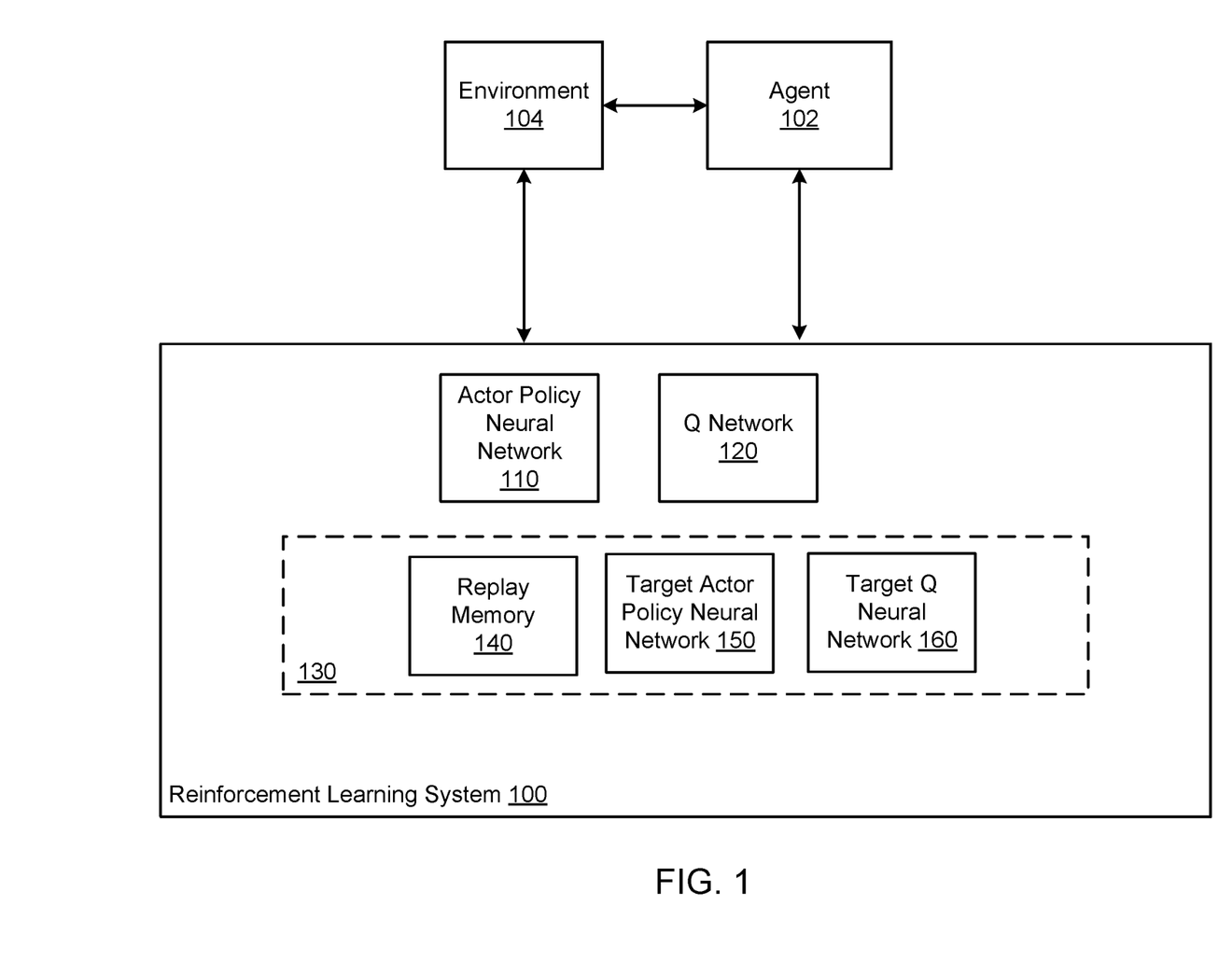
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from a discrete set of actions to be performed by the reinforcement learning agent 102 in response to the observation.

Generally, the action space is a large action space, i.e., a space that includes many different possible actions. More specifically, the action space includes at least on the order of $10^3$ actions and, in some cases, $10^6$ or more actions.

Each action in the action space is represented by a respective point in a multi-dimensional space. For example, in implementations where the environment is a content item recommendation setting, the points in the multi-dimensional space can be representations of content items that reflect topical or other similarity between the content items. As another example, in implementations where the environment is a real-world environment and the agent is a robot or autonomous vehicle, each dimension of the space can correspond to a different control dimension of the robot or autonomous vehicle. As another example, in implementations where the environment is an industrial process, each dimension of the space can correspond to a different configurable setting for the industrial process.

In particular, the reinforcement learning system 100 selects actions using an actor policy neural network 110 and a Q network 120.

The actor policy neural network 110 is a neural network that is configured to receive an observation and to process the observation to generate an ideal point in the multi-dimensional space in accordance with the values of the parameters of the actor policy network 110. Although the set of actions is large, because the set of actions is discrete while the multi-dimensional space is continuous, the ideal point will likely not be a valid action, i.e., will not be one of the actions in the set of actions.

The Q network 120 is a neural network that is configured to receive a point in the multi-dimensional space representing an action from the set of actions and an observation and to process the point and the observation to generate a Q value for the action represented by the point in accordance with values of the parameters of the Q network 120. The Q value for the action represents an estimated time-discounted total future reward that will be received if the agent 102 performs the action in response to the observation.

To allow the agent 102 to effectively interact with the environment, the reinforcement learning system 100 trains the actor policy neural network 110 and the Q network 120 to determine trained values of the parameters of the actor policy neural network 110 and the Q network 120.

Once the actor policy neural network 110 has been trained, the reinforcement learning system 100 can effectively use the actor policy neural network 110 to select actions to be performed by the agent 104. In particular, when an observation is received, the reinforcement learning system 100 can process the observation using the actor policy neural network 110 to map the observation to an ideal point in accordance with the trained values of the parameters of the actor policy neural network 110. The reinforcement learning system 100 can then process points that are near the ideal point and that represent actions in the set of actions using the Q network 120 to select a new action and then direct the agent 102 to perform the new action in response to the observation. Selecting an action in response to an observation using the actor policy neural network 110 and the Q network 120 after both networks have been trained is described below with reference to FIG. 2.

To assist in the training of the actor policy neural network 110, the reinforcement learning system 100 maintains training components 130 that include a replay memory 140, a target actor policy neural network 150, and a target Q network 160.

The replay memory 140 stores experience tuples generated as a consequence of the interaction of the agent 102 with the environment 104 for use in training the actor policy neural network 110 and the Q network 120.

In particular, each experience tuple in the replay memory 140 includes a training observation that characterizes a training state of the environment, an action performed by the agent 102 in response to the training observation, a training reward received by the system 100 in response to the agent 102 performing the action, and a next observation characterizing a next state of the environment, i.e., the state that the environment transitioned into after the agent performed the action.

The reinforcement learning system 100 generates the experience tuples from the interactions of the agent 102 with the environment 104 during the training of the actor policy neural network 110 and the Q network 120. An example process for generating an experience tuple during training is described in more detail below with reference to FIG. 3.

The target actor policy neural network 150 is a neural network that is the same as, i.e., has the same neural network architecture as, the actor policy neural network 110, but that has possibly different parameter values from those of the actor policy neural network 110. Similarly, the target Q network 160 is a neural network that is the same as the Q network 120 but that has possibly different parameter values from the Q network 120.

To train the actor policy neural network 110 and the Q network 120 using the training components 130, the reinforcement learning system 100 repeatedly selects minibatches of experience tuples from the replay memory 140. Each minibatch of experience tuples includes a predetermined number of randomly selected experience tuples.

For each experience tuple in a given selected minibatch, the reinforcement learning system 100 uses the target actor policy neural network 150 and the target Q network 160 to determine updates for the current values of the parameters of the actor policy neural network 110 and the current values of the parameters of the Q network 120 and then adjusts the current values of the parameters of the actor policy neural network 110 and the current values of the parameters of the Q network 120 using the updates. Generating these updates and adjusting the current values of the parameters of the Q network 120 and the actor policy neural network 110 will be described in more detail below with reference to FIGS. 4 and 5.

During the training, the reinforcement learning system 100 also periodically updates the values of the parameters of the target Q network 160 and the values of the parameters of the target actor policy neural network 150 so that the values slowly track the changes to the values of the parameters of the Q network 120 and the values of the parameters of the actor policy neural network 110, respectively.

Generally, during the training, the reinforcement learning system 100 generates experience tuples and adds the generated tuples to the replay memory 140 independently of, i.e., asynchronously from, sampling experience tuples from the replay memory 140 and adjusting the parameters of the actor policy neural network 110. Adding an experience tuple to the replay memory 140 is described in more detail below with reference to FIG. 3.

Figure 2:
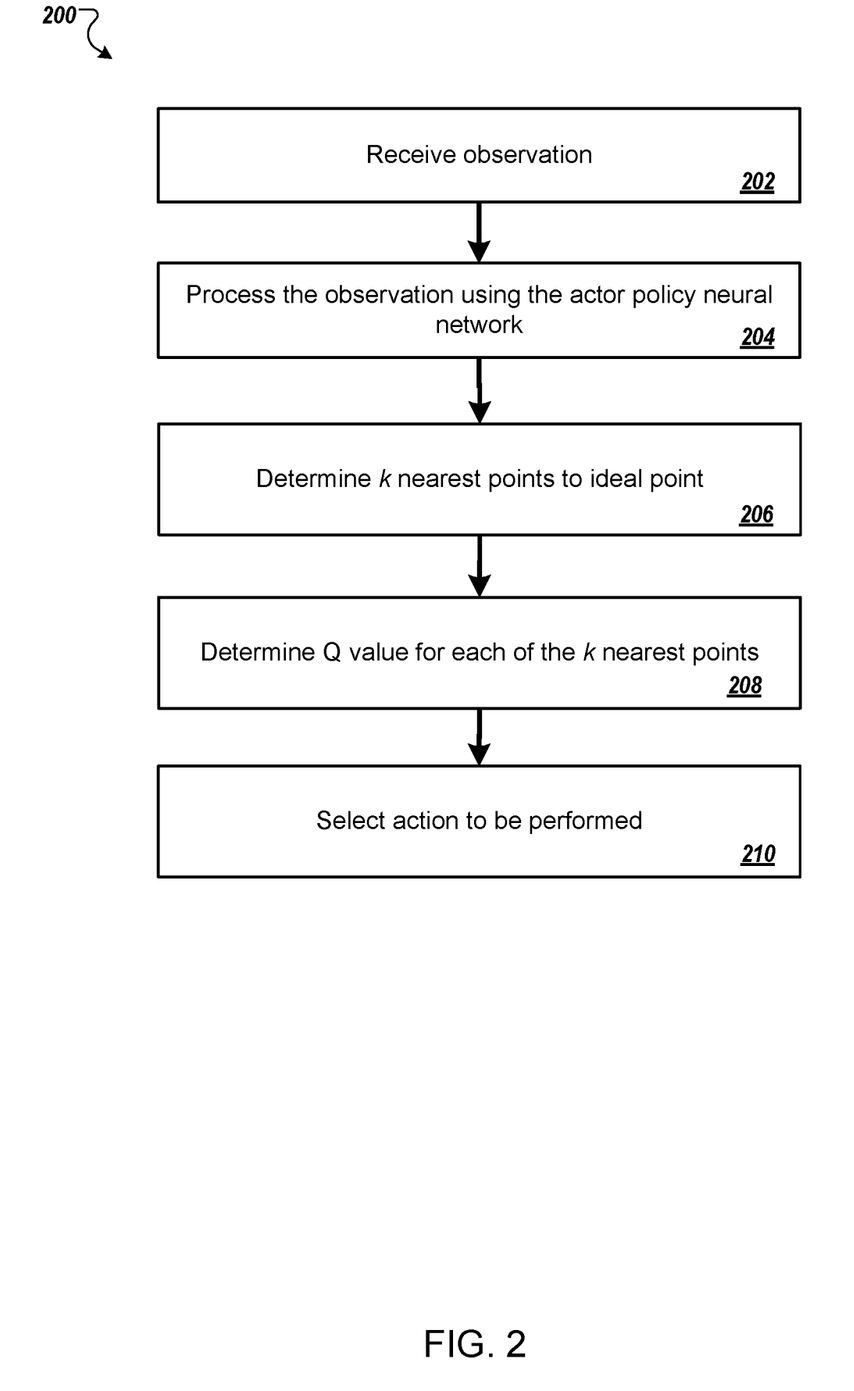
FIG. 2 is a flow diagram of an example process for selecting an action to be performed by an agent in response to an observation after training

FIG. 2 is a flow diagram of an example process 200 for selecting an action to be performed by an agent in response to an observation after training. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives a current observation characterizing the current state of the environment (step 202).

The system processes the observation using an actor policy neural network in accordance with current values of the parameters of the actor policy neural network (step 204). As described above, the actor policy neural network is configured to process the current observation to generate an ideal point in the multi-dimensional space.

The system determines, from the points in the multi-dimensional space that represent actions in the discrete set of actions, the k nearest points to the ideal point according to a distance metric, e.g., L2 distance (step 206). Generally, k is a predetermined integer greater than one. In some cases, k is a predetermined percentage of the total number of actions in the set of actions, e.g., 0.5%, 2%, or 5%.

The system can determine the k nearest points in any of a variety of ways. For example, in some implementations, the system determines the k nearest points using a nearest neighbor technique. As another example, in some other implementations, the system selects the actions using an approximate nearest neighbor technique. Example nearest neighbor and approximate nearest neighbor techniques that can be used to determine the k nearest points are described in Muja, Marius and Lowe, David G., Scalable nearest neighbor algorithms for high dimensional data. Pattern Analysis and Machine Intelligence, IEEE Transactions on, 36, 2014.

For each of the k nearest points, the system processes the point and the current observation using a Q network to generate a respective Q value for the actions represented by each of the nearest points (step 208). As described above, the Q value for a given action represents an estimated time-discounted total future reward that will be received in response to the agent performing the action in response to the observation.

The system selects an action from the k actions represented by the k nearest points based on the Q values for the actions (step 210). In some cases, the system selects the action having the highest Q value of any of the k actions. In some other cases, to encourage exploration of the environment by the agent, the system selects the action having the highest Q value of any of the k actions with probability $1-\varepsilon$ and selects a randomly selected action with probability c, where c is a constant between zero and one, exclusive.

Figure 3:
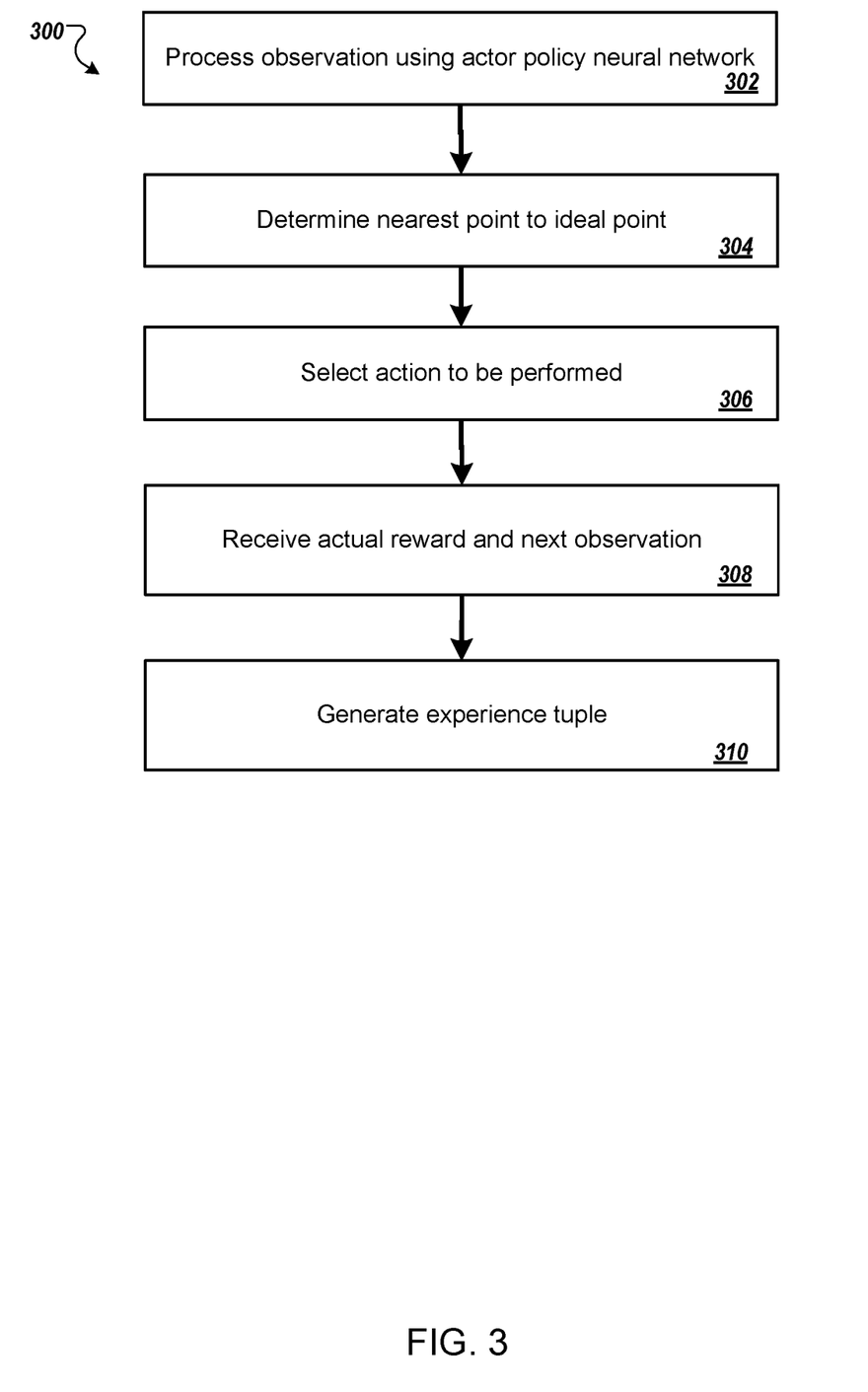
FIG. 3 is a flow diagram of an example process for adding an experience tuple to the replay memory during the training of the actor policy neural network and the Q network.

FIG. 3 is a flow diagram of an example process 300 for adding an experience tuple to the replay memory during the training of the actor policy neural network and the Q network.

For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system receives a current observation characterizing the current state of the environment (step 302).

The system processes the current observation using an actor policy neural network in accordance with current values of the parameters of the actor policy neural network to generate an ideal point in the multi-dimensional space (step 304).

The system determines, from the points that represent actions in the set of actions, the nearest point to the ideal point (step 306). For example, the system can perform a nearest neighbor lookup to identify the nearest point to the ideal point from the set of points that represent actions in the set of actions.

The system selects an action to be performed by the agent in response to the current observation in accordance with an exploration policy using the nearest point, i.e., and without processing multiple nearest points to the current ideal point using the Q network, and instructs the agent to perform the selected action (step 308). For example, the exploration policy may specify that the system select the action represented by the nearest point with probability $1-\varepsilon$ and select a randomly selected action with probability $\varepsilon$. As another example, the exploration policy may specify that the system select the action represented by the nearest point with probability $1-\varepsilon$ and select a randomly selected action from a provided subset of actions with probability $\varepsilon$. The provided subset of actions can be provided by an external process and can be a likely subset of good actions.

The system receives a reward and a next observation (step 310). The next observation characterizes the next state of the environment, i.e., the state that the environment transitioned into as a result of the agent performing the selected action, and the reward is a numeric value that is received by the system from the environment as a result of the agent performing the selected action.

The system generates an experience tuple that includes the current observation, the selected action, the reward, and the next observation and stores the generated experience tuple in a replay memory for use in training the actor policy neural network and the Q network (step 312).

Figure 4:
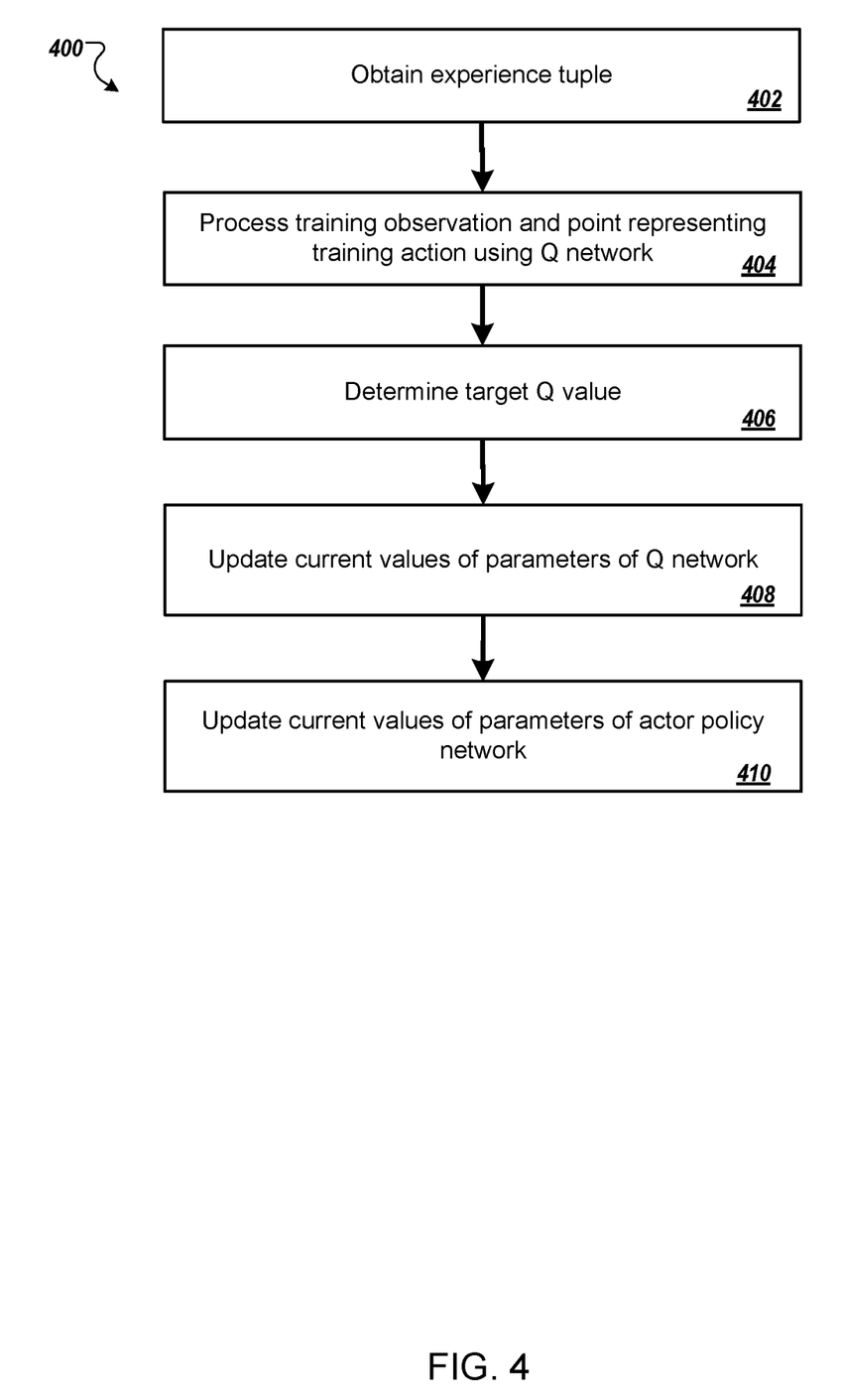
FIG. 4 is a flow diagram of an example process for determining an update to the current values of the parameters of the actor policy neural network and the Q network.

FIG. 4 is a flow diagram of an example process 400 for determining an update to the current values of the parameters of the actor policy neural network and the Q network. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system obtains an experience tuple (step 402). The experience tuple is one of the experience tuples in a mini-batch of experience tuples sampled from the replay memory by the system.

The experience tuple includes a training observation characterizing a training state of the environment, a training action from the continuous space of actions performed by the agent in response to receiving the training observation, a training reward received by the agent for performing the training action, and a next training observation characterizing a next training state of the environment.

The system processes the training observation and the selected action in the experience tuple using the Q network to determine a Q value for the experience tuple in accordance with current values of the parameters of the Q network (step 304).

The system determines a target Q value for the experience tuple from the training reward in the experience tuple and the next training observation in the experience tuple (step 306). Determining the target Q value is described in more detail below with reference to FIG. 5.

The system determines an update for the current values of the parameters of the Q network using an error between the target Q value for the experience tuple and the Q value that was generated by the Q network for the experience tuple (step 408). That is, the system can determine an update to the current values of the parameters that reduces the error using conventional machine learning training techniques, e.g., by performing an iteration of gradient descent with backpropagation. As will be clear from the description of FIG. 5, by updating the current values of the parameters in this manner, the system trains the Q network to generate Q values that represent time-discounted total future rewards that will be received in response the agent performing a given action in response to a given observation.

The system determines an update for the current values of the parameters of the actor policy neural network using the Q network (step 410).

In particular, to determine the update, the system processes the training observation in the tuple using the actor policy neural network in accordance with the current values of the parameters to generate an ideal point for the training observation.

The system then determines a parameter update for the current values of the actor policy neural network that is dependent on, i.e., is the product of or is a different combination of, (i) the gradient of the Q network with respect to the ideal point taken at the training observation—ideal point input pair and in accordance with the current values of the parameters of the Q network and (ii) the gradient of the actor policy neural network with respect to the parameters of the actor policy neural network taken at the training observation and in accordance with current values of the parameters of the actor policy neural network. The system can determine gradient (i) and gradient (ii) by backpropogating the respective gradients through the respective networks.

Generally, the system performs the process 400 for each experience tuple in a given minibatch to determine, for each tuple, an update for the parameters of the Q network and an update for the parameters of the actor policy neural network. Once the updates for each tuple in the minibatch have been determined, the system updates the current values of the parameters of the actor policy neural network and the current values of the parameters of the Q network using the updates for the tuples in the minibatch. For example, for each network, the system can add each update to the current values of the parameters of the network to update those values.

Once updated values of the parameters of actor policy neural network and the Q network have been determined, the system updates the current values of the target Q network parameters and the target actor policy neural network parameters so that the values slowly track the changes to the values of the parameters of the Q network and the value of the parameters of the actor policy neural network, respectively. In particular, the system constrains the values of the target Q network parameters and the target actor policy neural network parameters to change slowly during the training in order to improve the stability of the training process.

For example, the updated values of one of the target networks may be a linear interpolation between the updated values of the corresponding actor or Q network and the current values of the target network, with the current values of the target network being weighted more heavily in the interpolation.

By repeatedly performing the process 400 on multiple different minibatches of experience tuples, the system can train the actor policy neural network to determine trained values of the parameters of the actor policy neural network and to allow the actor policy neural network to effectively be used to select actions to be performed by the agent in interacting with the environment.

Figure 5:
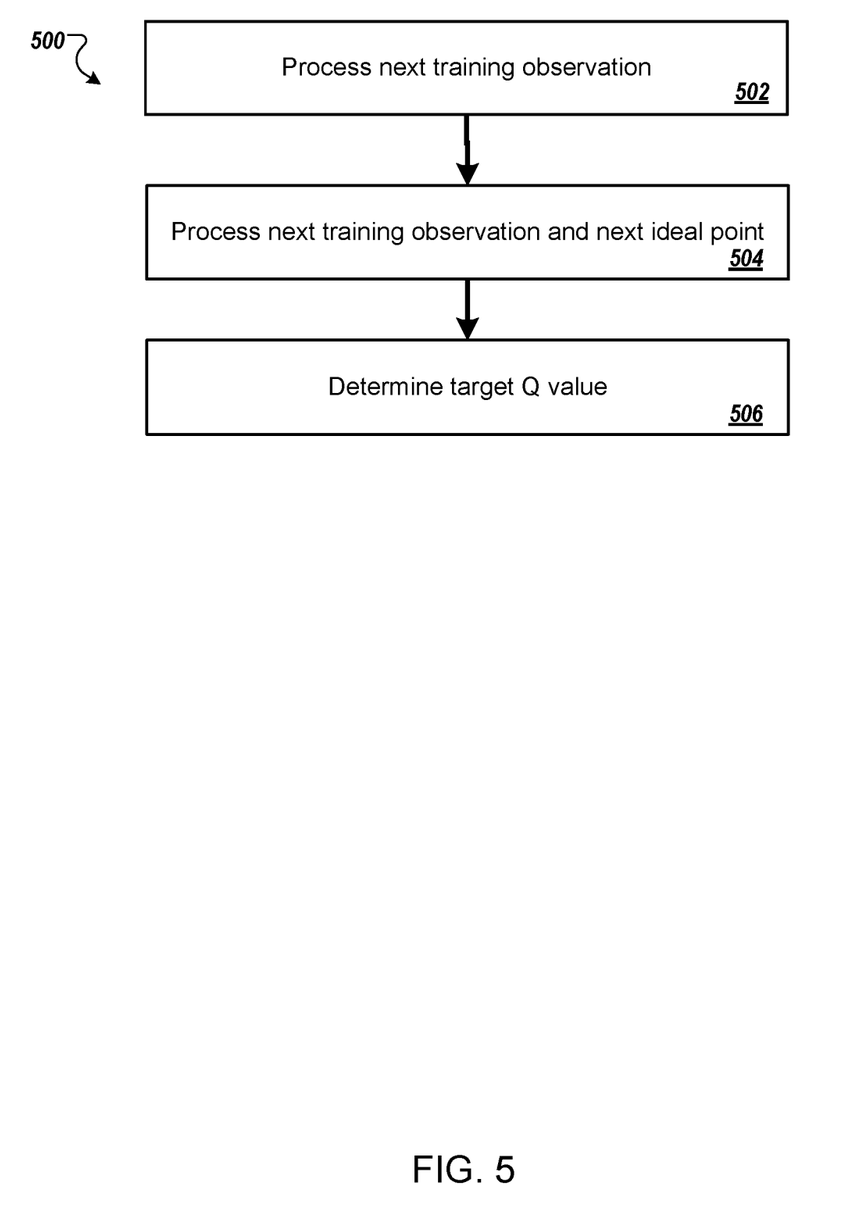
FIG. 5 is a flow diagram of an example process for determining a target Q value for an experience tuple.

FIG. 5 is a flow diagram of an example process 500 for determining a target Q value for an experience tuple. For convenience, the process 500 will be described as being performed by a system of one or more computers located in one or more locations. For example, a reinforcement learning system, e.g., the reinforcement learning system 100 of FIG. 1, appropriately programmed in accordance with this specification, can perform the process 500.

The system processes the next training observation in the experience tuple using a target actor policy neural network in accordance with current values of the parameters of the target actor policy neural network to generate a next ideal point (step 502). As described above, the target actor policy neural network is identical to the actor policy neural network, but with possibly different parameter values.

The system processes the next training observation and the next ideal point using a target Q network in accordance with current values of the parameters of the target Q network to generate a predicted next Q value (step 504). As described above, the target Q network is identical to the Q network, but with possibly different parameter values.

The system determines the target Q value for the experience tuple from the training reward and the predicted Q value for the experience tuple (step 506). In particular, the system multiplies the predicted Q value by a predetermined time discount factor and then sums the resulting product and the training reward to generate the target Q value for the experience tuple.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
  receiving a particular observation representing a particular state of an environment; and
  selecting an action from a discrete set of actions to be performed by an agent interacting with the environment, wherein each action in the discrete set of actions is represented by a respective point in a multi-dimensional space, and wherein selecting the action comprises:
    processing the particular observation using an actor policy network having a plurality of parameters, wherein the actor policy network is a neural network that is configured to receive the particular observation and to process the observation to generate an ideal point in the multi-dimensional space in accordance with first values of the parameters of the actor policy network, wherein the ideal point does not represent any of the actions in the discrete set of actions;
    determining, from the points that represent actions in the discrete set of actions, the k nearest points to the ideal point, wherein k is an integer greater than one;
    for each nearest point of the k nearest points:
      processing the nearest point and the particular observation using a Q network to generate a respective Q value for the action represented by the nearest point, wherein the Q network is a neural network that has a plurality of parameters and that is configured to receive the particular observation and the nearest point and to process the particular observation and the nearest point to generate the respective Q value for the action represented by the nearest point in accordance with first values of the parameters of the Q network; and
    selecting, as the action to be performed by the agent, the action from the k actions represented by the k nearest points that has a highest respective Q value among the k actions.

2. The method of claim 1, wherein the discrete set of actions comprises at least $10^3$ actions.

3. The method of claim 1, wherein determining k nearest points to the ideal point comprises determining the k nearest neighbors to the ideal point using an approximate nearest neighbor technique.

4. The method of claim 1, further comprising:
  training the actor policy network and the Q network, comprising:
    receiving a current observation representing a current state of the environment;
    processing the current observation using the actor policy network to generate a current ideal point in the multi-dimensional space in accordance with current values of the parameters of the actor policy network;
    determining, from the points that represent actions in the discrete set of actions, the nearest point to the current ideal point;
    selecting a current action to be performed by the agent in response to the current observation in accordance with an exploration policy using the nearest point to the current ideal point;
    in response to the agent performing the current action, receiving an actual reward and a next observation representing a next state of the environment;
    generating a current experience tuple that comprises the current observation, the current action, the actual reward, and the next observation; and
    storing the current experience tuple in a replay buffer.

5. The method of claim 4, wherein selecting a current action to be performed by the agent in response to the current observation in accordance with an exploration policy using the nearest point to the current ideal point comprises:
  selecting the action represented by the nearest point to the current ideal point with probability 1−ε; and
  selecting an action randomly from the discrete set of actions with probability ε.

6. The method of claim 4, further comprising:
  independently of selecting the current action and storing the current experience tuple in the replay buffer:
    obtaining a minibatch of experience tuples from the replay buffer, each experience tuple comprising a training observation representing a training state of the environment, a training action from the discrete set of actions performed by the agent in response to the training observation, a training reward received in response to the agent for performing the training action, and a next training observation representing a next training state of the environment; and
    updating the current values of the parameters of the Q network and the actor policy network using the minibatch of experience tuples, comprising:
      for each experience tuple in the minibatch:
        processing the training observation and a point representing the training action in the experience tuple using the Q network to determine a Q value for the experience tuple in accordance with current values of parameters of the Q network, and
        determining a target Q value for the experience tuple from the training reward in the experience tuple and the next training observation in the experience tuple;
      updating current values of the parameters of the Q network using errors between the target Q values and the Q values for the experience tuples in the minibatch; and
      updating the current values of the parameters of the actor policy network using the updated values of the parameters of the Q network.

7. A system comprising one or more computers and one or more storage devices storing instructions that when executed by one or more computers cause the one or more computers to perform operations comprising:
   receiving a particular observation representing a particular state of an environment; and
   selecting an action from a discrete set of actions to be performed by an agent interacting with the environment, wherein each action in the discrete set of actions is represented by a respective point in a multi-dimensional space, and wherein selecting the action comprises:
      processing the particular observation using an actor policy network having a plurality of parameters, wherein the actor policy network is a neural network that is configured to receive the particular observation and to process the observation to generate an ideal point in the multi-dimensional space in accordance with first values of the parameters of the actor policy network, wherein the ideal point does not represent any of the actions in the discrete set of actions;
      determining, from the points that represent actions in the discrete set of actions, the k nearest points to the ideal point, wherein k is an integer greater than one;
      for each nearest point of the k nearest points:
         processing the nearest point and the particular observation using a Q network to generate a respective Q value for the action represented by the nearest point, wherein the Q network is a neural network that has a plurality of parameters and that is configured to receive the particular observation and the nearest point and to process the particular observation and the nearest point to generate the respective Q value for the action represented by the nearest point in accordance with first values of the parameters of the Q network; and
      selecting, as the action to be performed by the agent, the action from the k actions represented by the k nearest points that has a highest respective Q value among the k actions.

8. The system of claim 7, wherein the discrete set of actions comprises at least $10^3$ actions.

9. The system of claim 7, wherein determining k nearest points to the ideal point comprises determining the k nearest neighbors to the ideal point using an approximate nearest neighbor technique.

10. The system of claim 7, the operations further comprising:
   training the actor policy network and the Q network, comprising:
      receiving a current observation representing a current state of the environment;
      processing the current observation using the actor policy network to generate a current ideal point in the multi-dimensional space in accordance with current values of the parameters of the actor policy network;
      determining, from the points that represent actions in the discrete set of actions, the nearest point to the current ideal point;
      selecting a current action to be performed by the agent in response to the current observation in accordance with an exploration policy using the nearest point to the current ideal point;
      in response to the agent performing the current action, receiving an actual reward and a next observation representing a next state of the environment;
      generating a current experience tuple that comprises the current observation, the current action, the actual reward, and the next observation; and
      storing the current experience tuple in a replay buffer.

11. The system of claim 10, wherein selecting a current action to be performed by the agent in response to the current observation in accordance with an exploration policy using the nearest point to the current ideal point comprises:
   selecting the action represented by the nearest point to the current ideal point with probability 1−ε; and
   selecting an action randomly from the discrete set of actions with probability ε.

12. The system of claim 10, the operations further comprising:
   independently of selecting the current action and storing the current experience tuple in the replay buffer:
   obtaining a minibatch of experience tuples from the replay buffer, each experience tuple comprising a training observation representing a training state of the environment, a training action from the discrete set of actions performed by the agent in response to the training observation, a training reward received in response to the agent for performing the training action, and a next training observation representing a next training state of the environment; and
   updating the current values of the parameters of the Q network and the actor policy network using the minibatch of experience tuples, comprising:
   for each experience tuple in the minibatch:
      processing the training observation and a point representing the training action in the experience tuple using the Q network to determine a Q value for the experience tuple in accordance with current values of parameters of the Q network, and
      determining a target Q value for the experience tuple from the training reward in the experience tuple and the next training observation in the experience tuple;
   updating current values of the parameters of the Q network using errors between the target Q values and the Q values for the experience tuples in the minibatch; and
   updating the current values of the parameters of the actor policy network using the updated values of the parameters of the Q network.

13. One or more non-transitory computer storage media storing instructions that when executed by the one or more computers cause the one or more computers to perform operations comprising:
   receiving a particular observation representing a particular state of an environment; and
   selecting an action from a discrete set of actions to be performed by an agent interacting with the environment, wherein each action in the discrete set of actions is represented by a respective point in a multi-dimensional space, and wherein selecting the action comprises:
      processing the particular observation using an actor policy network having a plurality of parameters, wherein the actor policy network is a neural network that is configured to receive the particular observation and to process the observation to generate an ideal point in the multi-dimensional space in accordance with first values of the parameters of the actor policy network, wherein the ideal point does not represent any of the actions in the discrete set of actions;

determining, from the points that represent actions in the discrete set of actions, the k nearest points to the ideal point, wherein k is an integer greater than one;

for each nearest point of the k nearest points:
processing the nearest point and the particular observation using a Q network to generate a respective Q value for the action represented by the nearest point, wherein the Q network is a neural network that has a plurality of parameters and that is configured to receive the particular observation and the nearest point and to process the particular observation and the nearest point to generate the respective Q value for the action represented by the nearest point in accordance with first values of the parameters of the Q network; and selecting, as the action to be performed by the agent, the action from the k actions represented by the k nearest points that has a highest respective Q value among the k actions.

14. The non-transitory computer storage media of claim 13, wherein the discrete set of actions comprises at least 10^3 actions.

15. The non-transitory computer storage media of claim 13, wherein determining k nearest points to the ideal point comprises determining the k nearest neighbors to the ideal point using an approximate nearest neighbor technique.

16. The non-transitory computer storage media of claim 13, the operations further comprising:
training the actor policy network and the Q network, comprising:
receiving a current observation representing a current state of the environment;
processing the current observation using the actor policy network to generate a current ideal point in the multi-dimensional space in accordance with current values of the parameters of the actor policy network;
determining, from the points that represent actions in the discrete set of actions, the nearest point to the current ideal point;
selecting a current action to be performed by the agent in response to the current observation in accordance with an exploration policy using the nearest point to the current ideal point;
in response to the agent performing the current action, receiving an actual reward and a next observation representing a next state of the environment;
generating a current experience tuple that comprises the current observation, the current action, the actual reward, and the next observation; and
storing the current experience tuple in a replay buffer.

17. The non-transitory computer storage media of claim 16, wherein selecting a current action to be performed by the agent in response to the current observation in accordance with an exploration policy using the nearest point to the current ideal point comprises:
selecting the action represented by the nearest point to the current ideal point with probability $1-\varepsilon$; and
selecting an action randomly from the discrete set of actions with probability $\varepsilon$.

18. The non-transitory computer storage media of claim 15, the operations further comprising:
independently of selecting the current action and storing the current experience tuple in the replay buffer:
obtaining a minibatch of experience tuples from the replay buffer, each experience tuple comprising a training observation representing a training state of the environment, a training action from the discrete set of actions performed by the agent in response to the training observation, a training reward received in response to the agent for performing the training action, and a next training observation representing a next training state of the environment; and
updating the current values of the parameters of the Q network and the actor policy network using the minibatch of experience tuples, comprising:
for each experience tuple in the minibatch:
processing the training observation and a point representing the training action in the experience tuple using the Q network to determine a Q value for the experience tuple in accordance with current values of parameters of the Q network, and
determining a target Q value for the experience tuple from the training reward in the experience tuple and the next training observation in the experience tuple;
updating current values of the parameters of the Q network using errors between the target Q values and the Q values for the experience tuples in the minibatch; and
updating the current values of the parameters of the actor policy network using the updated values of the parameters of the Q network.

* * * * *